United States Patent
Wei

(10) Patent No.: US 10,812,954 B2
(45) Date of Patent: Oct. 20, 2020

(54) USER EXPERIMENT (UE) AND BASE STATION AND RELATED METHODS FOR VEHICLE-TO-EVERYTHING (V2X) SERVICE

(71) Applicant: SHARP KABUSHIKI KAISHA, Sakai, Osaka (JP)

(72) Inventor: Xusheng Wei, Staines (GB)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 121 days.

(21) Appl. No.: 16/085,252

(22) PCT Filed: Mar. 15, 2017

(86) PCT No.: PCT/JP2017/010361
§ 371 (c)(1),
(2) Date: Sep. 14, 2018

(87) PCT Pub. No.: WO2017/159724
PCT Pub. Date: Sep. 21, 2017

(65) Prior Publication Data
US 2019/0090108 A1    Mar. 21, 2019

Related U.S. Application Data

(60) Provisional application No. 62/309,656, filed on Mar. 17, 2016.

(51) Int. Cl.
*H04W 4/46* (2018.01)
*H04W 4/02* (2018.01)
(Continued)

(52) U.S. Cl.
CPC .......... *H04W 4/46* (2018.02); *H04W 4/027* (2013.01); *H04W 4/40* (2018.02); *H04W 4/44* (2018.02);
(Continued)

(58) Field of Classification Search
CPC .......... H04W 4/40; H04W 4/44; H04W 4/46; H04W 4/70; H04W 4/027; H04W 8/245; H04W 72/048; H04W 72/1289
See application file for complete search history.

(56) References Cited

U.S. PATENT DOCUMENTS 10,187,903 B2 * 1/2019 Lee .................. H04J 11/00
2015/0365840 A1 * 12/2015 Yang ............... H04L 5/0048
370/254
(Continued)

FOREIGN PATENT DOCUMENTS

| WO | 2016/018075 | A1 | 2/2016 | |
| WO | 2016/021922 | A1 | 2/2016 | |
| WO | WO-2016018075 | A1 * | 2/2016 | ......... H01J 11/00 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0 (Dec. 2015).
(Continued)

*Primary Examiner* — Afsar M Qureshi
(74) *Attorney, Agent, or Firm* — ScienBiziP, P.C.

(57) ABSTRACT

User Equipment (UE) receives a system information block for V2X service, and transmits V2X related UE side information. The system information block includes at least an information element indicating resource pool configuration for V2X service.

4 Claims, 3 Drawing Sheets

UE information acquisition

(51) Int. Cl.
*H04W 72/12* (2009.01)
*H04W 4/40* (2018.01)
*H04W 4/44* (2018.01)
*H04W 4/70* (2018.01)
*H04W 8/24* (2009.01)
*H04W 72/04* (2009.01)

(52) U.S. Cl.
CPC ............ *H04W 4/70* (2018.02); *H04W 8/245* (2013.01); *H04W 72/048* (2013.01); *H04W 72/1289* (2013.01)

(56) References Cited

U.S. PATENT DOCUMENTS

| | | | |
|---|---|---|---|
| 2017/0215203 | A1 | 7/2017 | Lee et al. |
| 2017/0223752 | A1 | 8/2017 | Jung et al. |
| 2017/0272384 | A1* | 9/2017 | Lee .......................... H04W 4/40 |
| 2018/0213365 | A1* | 7/2018 | Yi ............................ H04W 4/06 |
| 2018/0249307 | A1* | 8/2018 | Kim .......................... H04L 5/00 |
| 2018/0255558 | A1* | 9/2018 | Lee ....................... H04W 76/14 |
| 2019/0045521 | A1* | 2/2019 | Hong ................. H04W 72/0446 |
| 2019/0116586 | A1* | 4/2019 | Basu Mallick ....... H04W 64/00 |
| 2019/0124669 | A1* | 4/2019 | Luo .................... H04W 72/048 |

OTHER PUBLICATIONS

Panasonic. "Discussion on resource allocation mechanism in V2X", 3GPP TSG RAN WG1 Meeting #83, R1-156963, Anaheim, USA, Nov. 15-22, 2015.

Huawei, Hisilicon. "Resource pool design for V2V", 3GPP TSG RAN WG1 Meeting #83, R1-156428, Anaheim, USA, Nov. 15-22, 2015.

Ericsson. "Discussion on V2X PC5 Scheduling, Resource Pools and Resource Patterns", 3GPP TSG RAN WG1 Meeting #83, R1-157355, Anaheim, USA, Nov. 15-22, 2015.

Fujitsu. "Discussion of Resource Allocation for PC5 based V2V", 3GPP TSG RAN WG1 Meeting #83, R1-156618, Anaheim , USA, Nov. 15-22, 2015.

LG Electronics, Gatt, Vodafone, Huawei. "New SI proposal: Feasibility Study on LTE-based V2X Services", 3GPP TSG RAN Meeting #68, RP-151109, Malmö, Sweden, Jun. 15-18, 2015.

Huawei, Hisilicon. "V2V Traffic model and performance metrics", 3GPP TSG RAN WG1 Meeting #82, R1-153803, Beijing, China, Aug. 24-28, 2015.

"3rd Generation Partnership Project; Technical Specification Group Services and System Aspects; Study on LTE support for Vehicle to Everything (V2X) services (Release 14)", 3GPP TR 22.885 V14.0.0 (Dec. 2015).

* cited by examiner

Figure 1 Release-12 D2D resource allocation configuration

Figure 2 D2D resource pool design, FDM format (a)

Figure 3 D2D resource pool design, FDM multiplex at frame level (b)

Figure 3 Mapping between SA pool and data pool

Figure 4 UE information acquisition

USER EXPERIMENT (UE) AND BASE STATION AND RELATED METHODS FOR VEHICLE-TO-EVERYTHING (V2X) SERVICE

TECHNICAL FIELD

One aspect of the invention proposes solutions on signaling design for resource pool allocation for V2X service.

BACKGROUND ART

Within the past few years, the LTE deployment is accelerated all over the world. The massive adoption of LTE with its monopoly position in the telecommunication market, high data rate, low latency and enhanced coverage provides good opportunities for vehicle industry to implement the idea of "connected car", a concept which has emerged since one decade ago.

The idea of "connected car" includes a few scenarios such as: vehicles changes information with other vehicles (V2V), with the roadside infrastructure (V2I), with a backend server (e.g., from a vehicle manufacturer or other mobility service providers) or with the Internet (V2N), or with a pedestrian (V2P), etc. An umbrella concept V2X was proposed to refer to all these aforementioned scenarios.

3GPP TR 22.885 [1] lists a number of use cases of V2X services. Based on these use cases, some of common requirements (mainly for V2V) are as follows:

- The RV V2V Service layer periodically broadcasts a message, indicating its current position, speed, acceleration and optional estimated trajectory.
- The E-UTRA(N) shall be able to support a maximum frequency of 10 V2V messages per second.
- The E-UTRA(N) shall be able to support high mobility performance (e.g. a maximum absolute velocity of 160 km/h).
- The E-UTRA(N) shall be able to support high mobility performance (e.g. support a maximum relative velocity of 280 km/h.
- The E-UTRA(N) shall be able to support a maximum latency of 100 ms.

Comparing to R12 D2D scenario, in V2x (V2V) communication scenarios, every vehicle has to receive information from all the nearby vehicles continuously, which brings significant challenges to the capacity and latency requirement, if using Rel-12/13 D2D communication as a base. A summary of challenges for V2x are listed below:

- Latency: 100 ms is the maximum latency for V2V packets which is a much more stringent requirement compared with that for D2D communication.
- Device density: D2D for Rel-12 mainly targets for public safety UEs, for example only 3 communication sessions per cell at average are assumed in D2D simulations [2 R1-153803]. With V2V, there could be up to hundreds of vehicles per cell.
- Size of packet: Rel-12 D2D was designed with voice service in mind whereas typical packet size for V2V maybe 50-300 bytes in order to suitable for various service purpose.
- Coverage: the communication range requirement of D2D can be up to 2.5 kilometers. On the other side V2V communication range only needs to be at most 320 meters which implies more efficient code rates (higher coding rate) can be used.
- Various traffic features: normally V2X traffic is different for different areas and time. In addition to the variation of traffic amount, the type of traffic is also various, for example regular V2V traffic and event-triggered traffic, which could demand significant different QoS requirement.

CITATION LIST

Non Patent Literature

NPL 1: 3GPP TR 22.885, "Study on LTE support for Vehicle to Everything (V2X) services", V14.0.0

NPL 2: R1-153803 "V2V traffic model and performance metrics", Huawei, HiSilicon, RAN1 #82, Aug. 24-28, 2015.

NPL 3: RP-151109, "New SI proposal: Feasibility Study on LTE-based V2X Services"

NPL 4: R1-156618, "Discussion of Resource Allocation for PC5 based V2V", Fujitsu, 3GPP RAN1 83

NPL 5: R1-157355, "Discussion on V2X PC5 Scheduling, Resource Pools and Resource Patterns", Ericsson, 3GPP RAN1 83

NPL 6: R1-156428,"Resource pool design for V2V", Huawei, HiSilicon, 3GPP RAN1 83

NPL 7: R1-156963, "Discussion on resource allocation mechanism in V2X", Panasonic, 3GPP RAN1 83

NPL 8: 3GPP TS36.331, "Radio Resource Control (RRC) Protocol Specification", V13.0.0

SUMMARY OF INVENTION

Technical Problem

The specification design of V2X communication over PC5 interface will make the best use of the already existing Rel-12/13 D2D design due to various reasons, for example to meet the market timing requirement, legacy requirement and less specification effort. However significant update on the Rel-12/13 D2D design should be done in order to satisfy all new challenges of V2X service.

At the RAN #68 meeting, a SI on the "Feasibility Study on LTE-based V2X Services" [3] was approved with the following scope:

For support of PC5 transport for V2V services, at least including:

Identify necessary enhancements (e.g. of potential enhancements: mitigate impact of half duplex constraint, reduce resource collision, enhance pool structure, enhance resource patterns, SA (Scheduling Assignment) information transmitted in same subframe as the associated data) to the resource allocation mechanism to meet identified requirements for robustness, latency, overhead and capacity. Among these identified area, resource allocation and resource pool design is a crucial area for enhancement in order to meet V2X requirements.

Solution to Problem

According to the present invention, there is a provided a User Equipment (UE) comprising: a computer processor; a memory in electronic communication with the computer processor; instructions stored in the memory, the instructions being executable by the computer processor to: receive a system information block for V2X service, the system information block including at least an information element indicating resource pool configuration for V2X service, and transmit V2X related UE side information.

According to the present invention, there is a provided an evolved NodeB (eNB) comprising: a computer processor; a memory in electronic communication with the computer processor; instructions stored in the memory, the instructions being executable by the computer processor to: transmit a system information block for V2X service, the system information block including at least an information element indicating resource pool configuration for V2X service, and receive V2X related UE side information.

According to the present invention, there is a provided a method performed by a User Equipment (UE) comprising: receiving a system information block for V2X service, the system information block including at least an information element indicating resource pool configuration for V2X service, and transmitting V2X related UE side information.

According to the present invention, there is a provided a method performed by an evolved NodeB (eNB) comprising: transmitting a system information block for V2X service, the system information block including at least an information element indicating resource pool configuration for V2X service, and receiving V2X related UE side information.

Advantageous Effects of Invention

The proposed solutions provide fundamental signalling design on resource pool allocation for V2X service.

Figure 3:
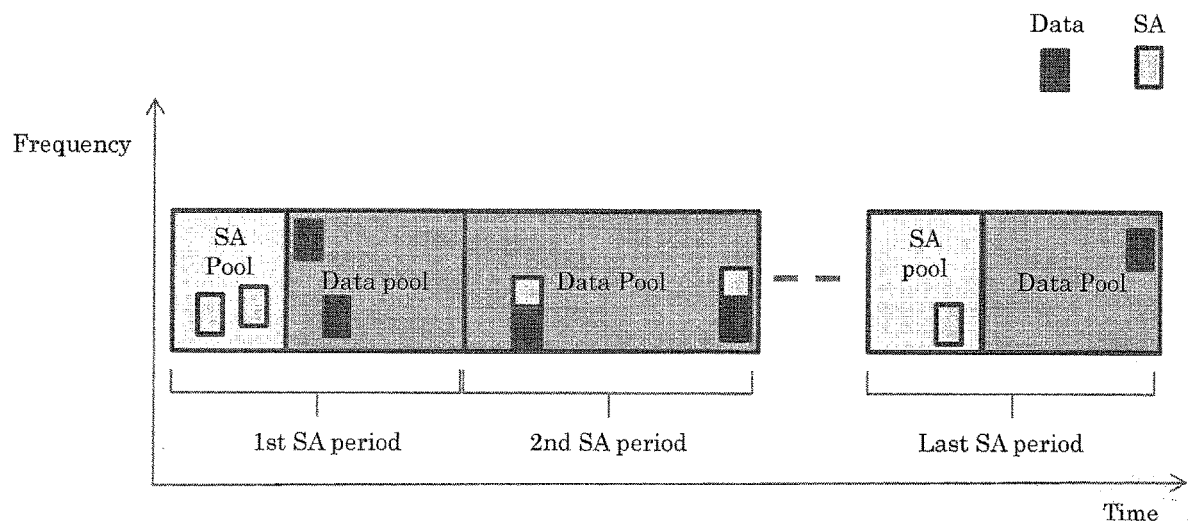
Figure 3:
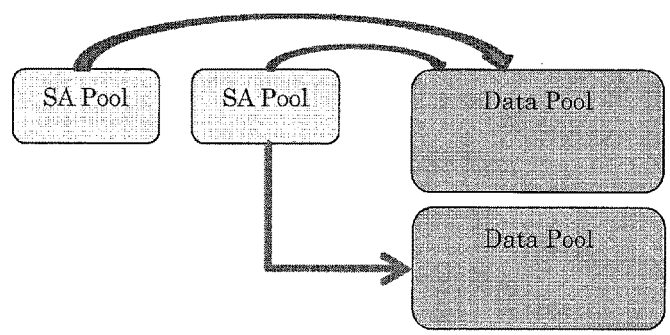

(a) of FIG. 3 shows D2D resource pool design, FDM multiplex at frame level. (b) of FIG. 3 shows Mapping between SA pool and data pool.

Figure 4:
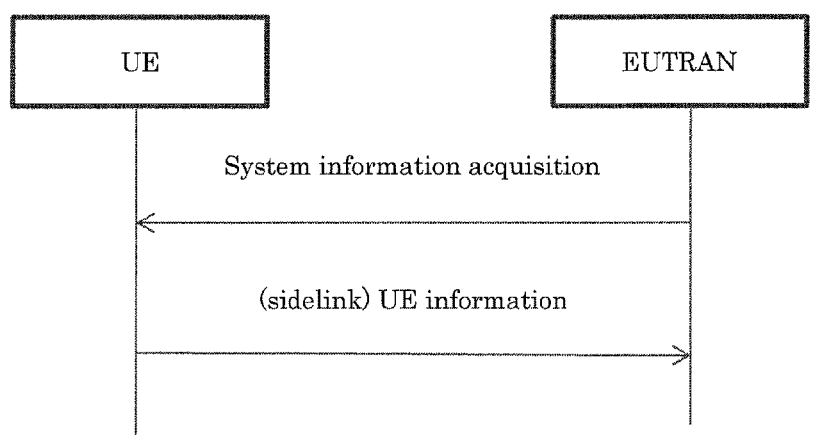

FIG. 4 is a figure which shows UE information acquisition.

DESCRIPTION OF EMBODIMENTS

Figure 1:
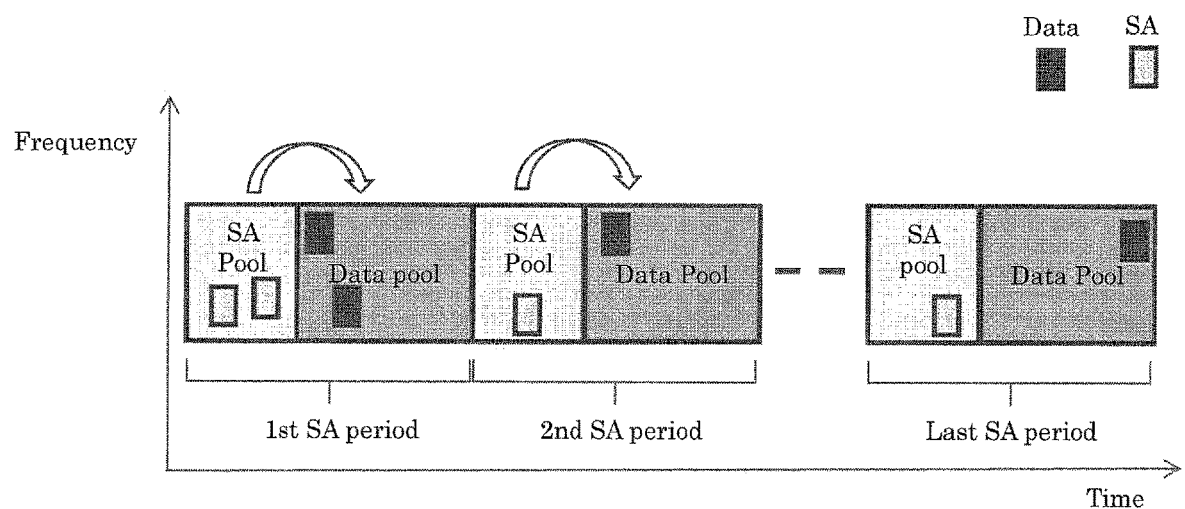
FIG. 1 is a figure which shows Release-12 D2D resource allocation configuration.

The current D2D resource pool allocation (using D2D communication mode 1 and mode 2 as an example) are illustrated in FIG. 1.

As illustrated in FIG. 1, the SA pool and Data pool are time multiplexed and there is one to one mapping between number of users to be supported based on the current LTE release-12/13 resource pool design. Various enhancement resource pool designs have been discussed in [4, 5, 6, 7]. Typically solutions are illustrated in FIG. 2 and FIG. 3.

Figure 2:
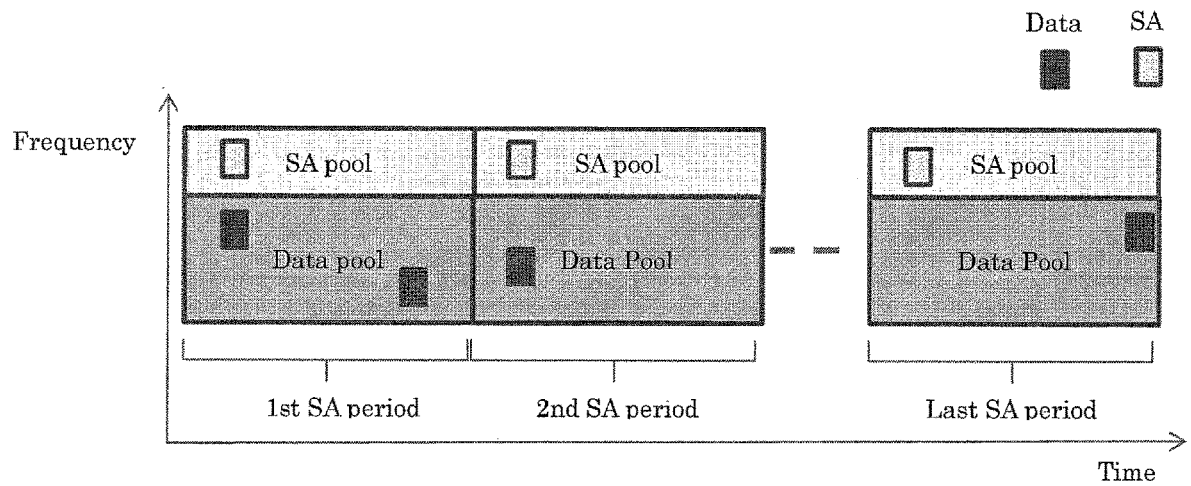
FIG. 2 is a figure which shows D2D resource pool design, FDM format.

FIG. 2 illustrates the resource pool design where SA pool and Data pool are multiplexed at the frequency domain. Through this way the SA resource/SA pool are always available within a particular SA period, which is helpful to meet the latency requirement of V2X service. However the in band emission issues maybe exacerbated which damages the reliability of the SA message decoding.

In FIG. 3 another possible resource pool configuration is provided where the SA message and data are frequency multiplexed per subframe. Compared with other configurations, more flexibility on scheduling can be achieved which makes it easy to meet the latency requirement of V2X service. It also has the potential to enhance the efficiency of resource utilization. On the other hand the signaling overhead could be increased and it is difficult to function under the out of coverage environment. Extensively specification effort is also required since the new design requires significant update if using the current LTE release 12/13 PC5 interface design as the baseline.

To satisfy the V2X requirement, the one to one mapping between SA pool and data pool, i.e., the current structure of PSCCH/PSSCH could be redesigned as well. The existing PSCCH/PSSCH channels are based on the physical resource pool periodicity, which means the allocation of single pool will result in common pool boundaries across all UEs. The common boundary could have negative effect on latency performance since it limits the flexibility. A few ways could be considered to smooth/remove the limitation of resource pool boundary such as allowing flexible association between SA pool and data pool together with multiple pool configuration; or introducing UE specific SA cycles. FIG. 4 illustrated the configuration where SA pool and data pool are not one to one mapping.

(System Information)

In LTE release 12/13, resource pool configuration for D2D communication or discovery could be broadcasted by system information 18 or 19. No matter the existing resource pool configuration is reused or enhanced, system information should be updated to support the introduction of V2X service. The current system information block 18 in LTE release 12/13 [8] is listed below.

```
SystemInformationBlockType18-r12 ::= SEQUENCE {
    commConfig-r12                      SEQUENCE {
        commRxPool-r12                      SL-CommRxPoolList-r12,
        commTxPoolNormalCommon-r12          SL-CommTxPoolList-r12       OPTIONAL,  -- Need OR
        commTxPoolExceptional-r12           SL-CommTxPoolList-r12       OPTIONAL,  -- Need OR
        commSyncConfig-r12                  SL-SyncConfigList-r12       OPTIONAL   -- Need OR
    }                                                                   OPTIONAL,  -- Need OR
    lateNonCriticalExtension            OCTET STRING                    OPTIONAL,
    ...,
    [[   commTxPoolNormalCommonExt-r13      SL-CommTxPoolListExt-r13    OPTIONAL,  -- Need OR
         commTxAllowRelayCommon-r13         ENUMERATED {true}           OPTIONAL   -- Need OR
    ]]
}
``` the SA pool and data pool within a particular SA period. Based on the LTE release 12/13 design, it is possible to have multiple resource pool configurations, i.e., more than one SA or data pool over one particular time point. Considering the new requirement/challenges of V2X service mentioned before, it is difficult to satisfy the legacy requirement and From the UE/device implementation point of view, it is very possible that a device which supports V2X feature does not support D2D feature. Hence it is reasonable to introduce a new system information block which can broadcast resource pool information within the cell, one possible implementation is listed below:

```
SystemInformationBlockType20 ::= SEQUENECE {
    V2xcommConfig                   SEQUENCE {
        V2XcommRxPool               SL-V2XCommRxPoolList,
        V2XcommTxPoolNormalCommon   SL-V2XCommTxPoolList    OPTIONAL,  -- Need OR
        V2XcommTxPoolExceptional    SL-V2XCommTxPoolList    OPTIONAL,  -- Need OR
        V2XcommSyncConfig           SL-V2XSyncConfigList    OPTIONAL   -- Need OR
    }                                                       OPTIONAL,  -- Need OR
    lateNonCriticalExtension        OCTET STRING            OPTIONAL,
    ...,
}
```

In addition it is also possible to extend the current system information 18 definition to include resource pool information for V2X service. One possible implementation is as the following:

```
SystemInformationBlockType18::= SEQUENCE {
    commConfig-r12                  SEQUENCE {
        commRxPool-r12              SL-CommRxPoolList-r12,
        commTxPoolNormalCommon-r12  SL-CommTxPoolList-r12       OPTIONAL,  -- Need OR
        commTxPoolExceptional-r12   SL-CommTxPoolList-r12       OPTIONAL,  -- Need OR
        commSyncConfig-r12          SL-SyncConfigList-r12       OPTIONAL   -- Need OR
    }                                                           OPTIONAL,  -- Need OR
    lateNonCriticalExtension        OCTET STRING                OPTIONAL,
    ...,
    [[ commTxPoolNormalCommonExt-r13   SL-CommTxPoolListExt-r13  OPTIONAL,  -- Need OR
       commTxAllowRelayCommon-r13      ENUMERATED {true}         OPTIONAL   -- Need OR
    ]]
    V2xcommConfig                   SEQUENCE {
        V2XcommRxPool               SL-V2XCommRxPoolList,
        V2XcommTxPoolNormalCommon   SL-V2XCommTxPoolList        OPTIONAL,  -- Need OR
        V2XcommTxPoolExceptional    SL-V2XCommTxPoolList        OPTIONAL,  -- Need OR
        V2XcommSyncConfig           SL-V2XSyncConfigList        OPTIONAL   -- Need OR
    }
}
```

(Resource Pool Configuration)

As mentioned before the resource pool configuration for V2X service could have significant change compared with the resource pool configuration signaling for LTE Rel-12/13 D2D service [8] which is copied below.

```
SL-CommResourcePool-r12 ::=     SEQUENCE {
    sc-CP-Len-r12               SL-CP-Len-r12,
    sc-Period-r12               SL-PeriodComm-r12,
    sc-TF-ResourceConfig-r12    SL-TF-ResourceConfig-r12,
    data-CP-Len-r12             SL-CP-Len-r12,
    dataHoppingConfig-r12       SL-HoppingConfigComm-r12,
    ue-SelectedResourceConfig-r12       SEQUENCE {
        data-TF-ResourceConfig-r12      SL-TF-ResourceConfig-r12,
        trpt-Subset-r12                 SL-TRPT-Subset-r12 OPTIONAL -- Need OP
    }                                   OPTIONAL,       -- Need OR
    rxParametersNCell-r12       SEQUENCE {
        tdd-Config-r12          TDD-Config          OPTIONAL,   -- Need OP
        syncConfigIndex-r12     INTEGER (0..15)
    }                                               OPTIONAL,   -- Need OR
    txParameters-r12            SEQUENCE {
        sc-TxParameters-r12         -r12,
        dataTxParameters-r12    SL-TxParameters-r12
    }                                               OPTIONAL,   -- Cond Tx
    ...,
    [[ priorityList-r13         SL-PriorityList-r13  OPTIONAL   -- Cond Tx
    ]]
}
```

Regarding the enhancement on the information element for resource pool configuration, one possible way is to remove the one to one association between the SA pool and data pool. It should be noted that the current Rel-12/13 specifications already support to configure multiple resource pools where the SA area and the data area is one-to-one mapping. However this method could have the following disadvantages:

1. The signaling overhead when configuring multiple pools could be large.

2. The efficiency of resource pool utilization. When multiple resource pools are configured in order to increase the SA opportunities (reduce the latency), there maybe not enough data for transmission hence the utilization of each resource pool among these parallel resource pool configurations maybe low.

3. Flexibility; the multiple-to-one mapping provides extra flexibility to configure SA and data.

In addition, considering the difference between the regular traffic and event triggered traffic, one solution is to allocate different SA pools to handle the scheduling of regular traffic and event triggered traffic whereas using the same data pool for data transmission/reception. To achieve this target the corresponding signaling of resource pool configuration should be updated. One possible implementation is listed below whereas more than one SA pool is configured within one SA period.

one to one association between the SA pool and data pool within one SA period (since the SA pool is always available it is not strongly desirable to change the one to one association between SA pool and data pool) whereas changes the TDM (Time Division Multiplexing) used in LTE release 12/13 to FDM. One possible implementation is to define SA pool signaling and data pool signaling separately. Alternatively the signaling of LTE release 12/13 can still be reused with limited update, one implementation is listed below.

```
SL-V2XCommResourcePool::=       SEQUENCE {
    sc-CP-Len                       SL-CP-Len,
    sc-Period                       SL-PeriodComm,
    sc-TF-ResourceConfig            SL-TF-ResourceConfig-r12,
    sc-add-TF-ResourceConfig        SEQUENCE (SIZE (1..maxSL-SAPool-1)) OF SL-TF-ResourceConfig-
r12,
    data-CP-Len                     SL-CP-Len,
    dataHoppingConfig               SL-HoppingConfigComm,
    ue-SelectedResourceConfig           SEQUENCE {
        data-TF-ResourceConfig              SL-TF-ResourceConfig,
        trpt-Subset                         SL-TRPT-Subset OPTIONAL      -- Need OP
    }                                                            OPTIONAL,  -- Need OR
    rxParametersNCell               SEQUENCE {
        tdd-Config                      TDD-Config              OPTIONAL,  -- Need OP
        syncConfigIndex             INTEGER (0..15)
    }
    txParameters                    SEQUENCE {
        sc-TxParameters                 SEQUENCE (SIZE (1..maxSL-SAPool)) OF SL-TxParameters,
        dataTxParameters-           SL-TxParameters
    }                                                            OPTIONAL,  -- Need OR
                                                                 OPTIONAL,  -- Cond Tx
    ...,
    [[  priorityList-r13            SL-PriorityList-r13          OPTIONAL    -- Cond Tx
    ]]
}
```

Another alternative for resource pool configuration enhancement is to consider the FDM (Frequency Division Multiplexing) between the SA pool and data pool as mentioned before. One possible implementation is to keep the

```
SL-V2XCommResourcePool::=       SEQUENCE {
    sc-CP-Len                       SL-CP-Len,
    sc-Period                       SL-PeriodComm,
    sc-TF-ResourceConfig            SL-TF-ResourceConfig-r12,
    data-CP-Len                     SL-CP-Len,
    dataHoppingConfig               SL-HoppingConfigComm,
    ue-SelectedResourceConfig           SEQUENCE {
        data-TF-ResourceConfig              data-TF-ResourceConfig,
        trpt-Subset                         SL-TRPT-Subset OPTIONAL      -- Need OP
    }                                                            OPTIONAL,  -- Need OR
    rxParametersNCell               SEQUENCE {
        tdd-Config                      TDD-Config              OPTIONAL,  -- Need OP
        syncConfigIndex             INTEGER (0..15)
    }
    txParameters                    SEQUENCE {
        sc-TxParameters                 SL-TxParameters,
        dataTxParameters-           SL-TxParameters
    }                                                            OPTIONAL,  -- Need OR
                                                                 OPTIONAL,  -- Cond Tx
    ...,
    [[  priorityList-r13            SL-PriorityList-r13          OPTIONAL    -- Cond Tx
    ]]
}
    data-TF-ResourceConfig::=       SEQUENCE {
        prb-Num                         INTEGER (1..100),
        prb-Start                       INTEGER (0..99),
        prb-End                         INTEGER (0..99),
        prb-FDM-offset                  INTEGER (0..99),
        offsetIndicator                 SL-OffsetIndicator,
        subframeBitmap                  SubframeBitmapSL
    }
```

The new IE data-TF-ResourceConfig will take care of the FDM implemenation. Bascially sidelink transmissions on a sub-frame can occur on PRB with index greater than or equal to prb-Start+prb-FDM-offset and less than prb-Start+prb-Num+prb-FDM-offset, and on PRB with index greater than prb-End−prb-Num−prb-FDM-offset and less than or equal to prb-End−prb-FDM-offset.

(UE Side Information)

Similar to LTE D2D at release 12/13, UE side information should be sent to eNB to facilitate the V2X service. Within the UE information message a UE could indicate its interest in V2X service (ask for activate or deactivate a particular V2X service), or indicate the frequency layer where a UE wants to involve in V2X service, or requires/release corresponding resource allocation for a particular V2X service, or requires measurement gap for monitoring corresponding resource pool for a particular V2X service purpose, or indicates corresponding measurement gaps for monitoring purpose.

One implementation is if a new system information block was introduced as described in section of (System information), then a new message to transferring UE side information related to V2X service should be provided. The procedure is shown in FIG. 4. Alternatively if the current existing system information 18/19 for D2D communication/discovery are updated to incorporate V2X communication/discovery, (Advantage)

The proposed solutions provide fundamental signalling design on resource pool allocation for V2X service.

The advantages are: provide solution on system signalling design to support V2X service. The implementation examples are given where one solution is based on the already existing system signalling for D2D operation and an alternative solution introduces new system signalling for resource pool configuration for V2X service. In addition solutions on how to design the resource pool configuration message are also provided. The procedure for UE side information delivery is also provided in one aspect of the invention.

At least the following points have been discussed in this disclosure. Not only the point listed below, but also their combinations are included in this disclosure.

A mechanism for signalling design for the resource allocation of V2X service is provided. The mechanism consists of signalling design for system information for V2X resource allocation, the signalling for resource pool configuration for V2X service and signalling for UE side information.

That said system signalling design consists of new system information block where the resource pool information for V2X service is broadcasted.

Alternatively, that said system signalling design consists of enhancing current available system information block 18/19 used for D2D communication/discovery to broadcast resource pool configurations for V2X service.

That said system information for resource pool configuration consists of new information element for resource pool configuration for V2X service.

Alternatively, that said system information for resource pool configuration consists of enhancing current available information element used for D2D resource pool configuration to make sure it is suitable for resource pool configuration for V2X service.

That said signalling for UE side information consists of a new procedure to transmit V2X related UE side information to eNB.

That said signalling for UE side information consists of enhancing on existing D2D UE side information transmission procedure to transmit V2X related UE side information to eNB.

The programs operated in an evolved NodeB (eNB) and a User Equipment (UE) according to the present invention may be programs (causing a computer to function) for controlling a central processing unit (CPU) such that the functions of the above-described embodiments according to the present invention are realized. The information treated in these devices is temporarily accumulated in a random access memory (RAM) at the time of the processing, and then is stored in various ROMs such as flash read-only memory (ROM) or hard disk drive (HDD). When necessary, the information is read by the CPU, and is modified or rewritten.

A part of the UE and the eNB according to the above-described embodiment may be realized as a computer. In this case, the program for realizing the control function may be recorded in a computer-readable recording medium, and the program recorded in the recording medium may be realized by being read and executed in a computer system.

It is assumed that the "computer system" mentioned herein is a computer system built into the UE or the eNB, and includes OS or hardware such as peripheral devices. The "computer-readable recording medium" refers to a portable medium such as a flexible disk, a magneto-optical disk, a ROM or a CD-ROM, and a storage device such as a hard disk built into the computer system.

The "computer-readable recording medium" may include a medium that dynamically retains programs for a short period of time such as a communication line in a case where programs are transmitted via a network such as the Internet or a communication circuit such as a telephone line, and a medium that retains programs for a regular period of time such as a volatile memory within the computer system which is a server or a client in this case. The program may be used to realize a part of the above-described functions, or may be realized by a combination of the above-described functions and programs already recorded in the computer system.

The eNB according to the above-described embodiment may be realized as an aggregate (device group) constituted by a plurality of devices. Each of the devices constituting the device group may include a part or all of the functions or functional blocks of the eNB according to the above-described embodiment. The device group may have the general functions or functional blocks of the eNB. The UE according to the above-described embodiment may communicate with the eNB as the aggregate.

The eNB according to the above-described embodiment may be Evolved Universal Terrestrial Radio Access Network (EUTRAN). The eNB according to the above-described embodiment may have a part or all of the functions of the higher node for the eNodeB.

A part or all of the UE and the eNB according to the above-described embodiment may be typically realized as LSI which is an integrated circuit, or may be realized as a chipset. The functional blocks of the UE and the eNB may be individually realized as a chip, or a part or all thereof may be realized as a chip by being integrated. The method of realizing the devices or functional blocks as the integrated circuit is not limited to the LSI, and a dedicated circuit or a general-purpose processor may be used. In a case where a technology of realizing the devices or functional blocks as the integrated circuit has appeared instead of the LSI due to the advance of semiconductor technology, an integrated circuit produced using this technology may be used.

Although it has been described in the embodiment that the UE is used as an example of the UE or the communication device, the present invention is not limited thereto. The present invention may also be applied to UE or communication devices of stationary or non-movable electronic devices which are installed indoors or outdoors, such as AV devices, kitchen devices, cleaning and washing machines, air conditioners, office devices, vending machines, and other home appliances.

The embodiments of the present invention have been described with reference to the drawings. However, the detailed structure is not limited to the above-described embodiments, and the present invention also includes a change in the design within the gist of the invention. The present invention may be variously changed without departing from the claims, and embodiments acquired by appropriately combining technical means disclosed in different embodiments are included in the technical range of the present invention. The elements described in the respective embodiments and structures acquired by replacing the elements that exhibit the same effects are included therein.

This Nonprovisional application claims priority under 35 U.S.C. § 119 on Patent Application No. 62/309,656 on Mar. 17, 2016, the entire contents of which are hereby incorporated by reference.

INDUSTRIAL APPLICABILITY

The present disclosure is applicable to at least V2X service for LTE Rel-14 and above. The present disclosure is also applicable to communication devices including the terminal device, other electronic devices, AV devices, other home appliances, bending machines, and other devices.

The invention claimed is:

1. A user equipment (UE) comprising:
a computer processor;
a memory in electronic communication with the computer processor;
instructions stored in the memory, the instructions being executable by the computer processor to:
receive a system information block for device-to-device (D2D) services and a system information block for Vehicle-to-Everything (V2X) service, the system information block for V2X being different from the system information block for D2D services and including at least an information element indicating resource pool configuration for the V2X service, and
transmit V2X related UE side information.

2. A base station comprising:
a computer processor;
a memory in electronic communication with the computer processor;
instructions stored in the memory, the instructions being executable by the computer processor to:
transmit a system information block for device-to-device (D2D) services and a system information block for Vehicle-to-Everything (V2X) service, the system information block for V2X being different from the system information block for D2D services and including at least an information element indicating resource pool configuration for the V2X service, and
receive V2X related UE side information.

3. A method performed by a user equipment (UE) comprising:
receiving a system information block for device-to-device (D2D) services and a system information block for Vehicle-to-Everything (V2X) service, the system information block for V2X being different from the system information block for D2D services and including at least an information element indicating resource pool configuration for the V2X service, and
transmitting V2X related UE side information.

4. A method performed by a base station comprising:
transmitting a system information block for device-to-device (D2D) services and a system information block for Vehicle-to-Everything (V2X) service, the system information block for V2X being different from the system information block for D2D services and including at least an information element indicating resource pool configuration for the V2X service, and
receiving V2X related UE side information.

* * * * *